(No Model.) 2 Sheets—Sheet 1.
G. D. BOND.
AUTOGRAPHIC REGISTER.
No. 570,535. Patented Nov. 3, 1896.
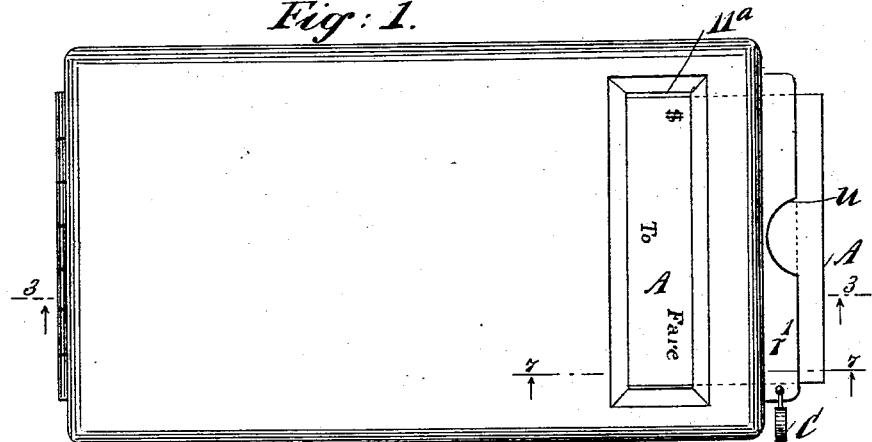
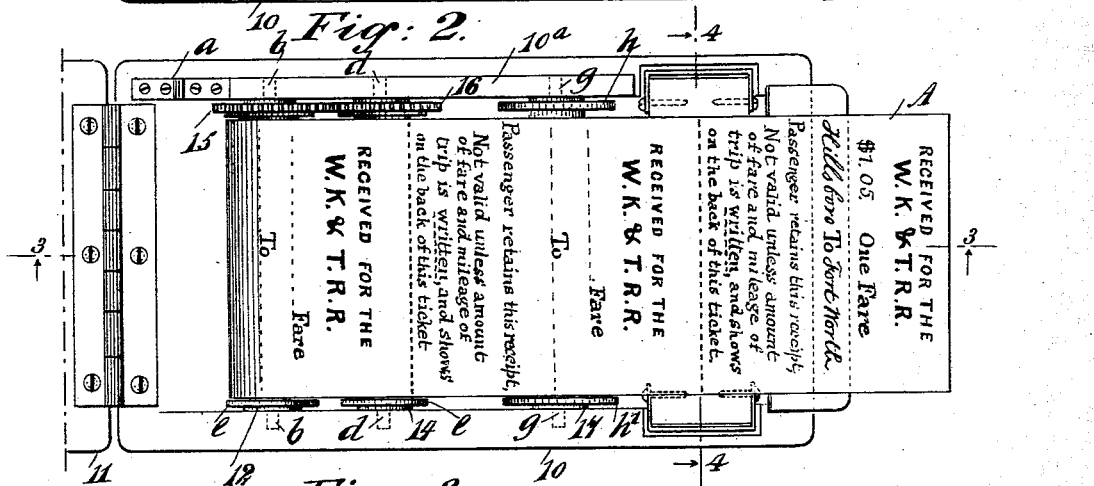
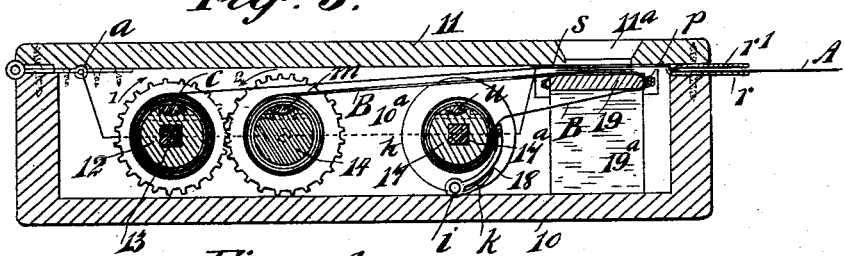
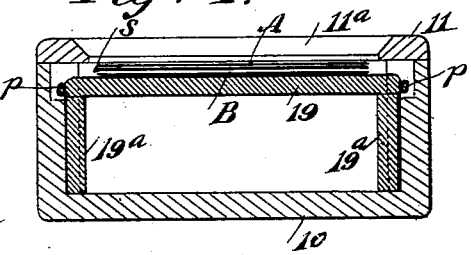
WITNESSES:
Wm P Patton
Herbert G Thorpe
INVENTOR
G. D. Bond
BY
ATTORNEYS.

(No Model.) G. D. BOND. 2 Sheets—Sheet 2.
AUTOGRAPHIC REGISTER.
No. 570,535. Patented Nov. 3, 1896.
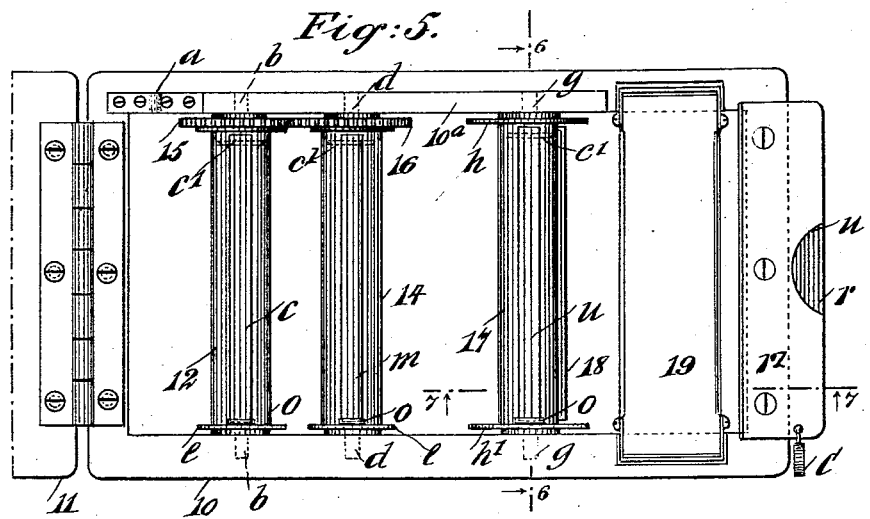
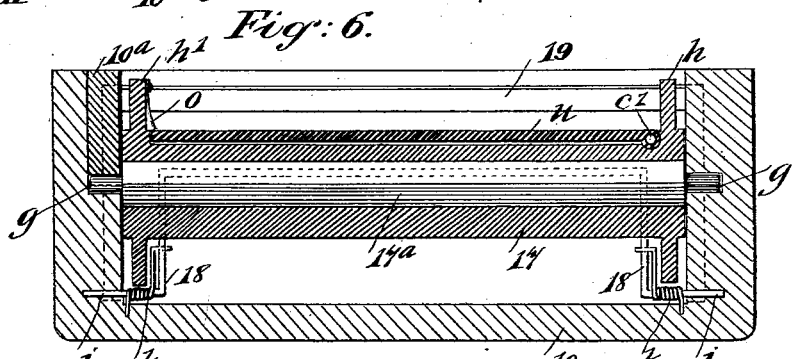
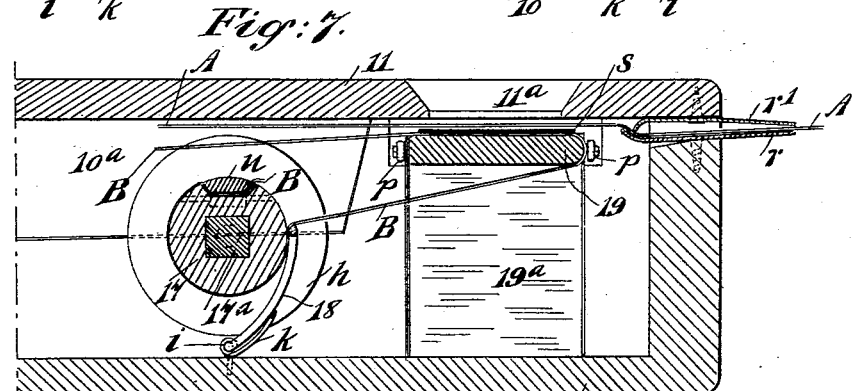
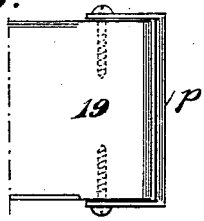
WITNESSES:
Wm. P. Patton
Herbert A. Thorpe
INVENTOR
G. D. Bond
BY
ATTORNEYS.

UNITED STATES PATENT OFFICE.

GEORGE D. BOND, OF HILLSBOROUGH, TEXAS.

AUTOGRAPHIC REGISTER.

SPECIFICATION forming part of Letters Patent No. 570,535, dated November 3, 1896.

Application filed January 10, 1896. Serial No. 575,020. (No model.)

*To all whom it may concern:*

Be it known that I, GEORGE D. BOND, of Hillsborough, in the county of Hill and State of Texas, have invented new and useful Improvements in Autographic Registers, of which the following is a full, clear, and exact description.

My invention relates to an improved device for registering fares paid by passengers in conveyances, and for other purposes of a like nature. In cars and other passenger-conveyances where cash fares are collected from passengers for a trip between stations, it is very essential that means be provided to enable the fare-collector to keep an accurate account of cash receipts as they are taken, this being of advantage to the collector and to his employers, as it facilitates a quick and accurate rendition of accounts.

On some railroads where local travel is considerable and passengers between stations do not secure regular tickets at offices of the railroad, but pay cash as fares on the cars, the railroad companies as a check on dishonest conductors or fare-collectors adopt the rebate system in the collection of fares. This, in brief, consists in providing conductors with tickets that represent an amount of cash payment to be made by the passenger, which is a certain per cent. in excess of the actual fare due for the distance traveled, the extra amount collected being returned as a rebate when the traveler presents the tickets at a main office of the company. In this way there is a check afforded to prevent the retention of cash fares by the fare-collector.

The object of my invention is to provide a small portable ticket-holder and registering device, which will be convenient in use, will facilitate the issue of valid tickets that may be for rebate or for the correct fare, which will enable a conductor to keep a correct current account of fares as received as well as a record of tickets sold and mileage traveled on same. The improved register will also afford an effective check or guard against dishonesty on the part of fare-collectors.

The invention consists, essentially, in the construction and combination of parts as is hereinafter described, and set out in the claims.

Reference is to be had to the accompanying drawings, forming a part of this specification, in which similar characters of reference indicate corresponding parts in all the figures.

Figure 1 is a plan view of the improved portable registering device. Fig. 2 is a plan view of the improvement having the case-lid opened and a portion of the same removed, exposing parts of the interior mechanism. Fig. 3 is a sectional side view, longitudinally taken, with the lid closed and substantially on the line 3 3 in Figs. 1 and 2. Fig. 4 is a transverse sectional view substantially on the line 4 4 in Fig. 2. Fig. 5 is a plan view of the register with its interior parts fully exposed by a removal of the lid, and of a ticket-strip which is shown in Fig. 2. Fig. 6 is an enlarged transverse sectional view on the line 6 6 in Fig. 5. Fig. 7 is an enlarged longitudinal sectional view of parts of the device, substantially on the line 7 7 in Figs. 1 and 5; and Fig. 8 is a detached and enlarged plan view of an end portion of a ticket-supporting table, which is a feature of the invention.

In the drawings, 10 represents a preferably rectangular case of suitable dimensions for the reception and proper support of the working parts of the improved register. The case 10 is open on what may be termed its "upper" side, and a lid 11 is hinged thereto at one end or, if preferred, may be thus loosely secured at one side edge of the case. One side wall of the case 10 is recessed for a portion of its length and about one-half of its height from the bottom wall on the inner surface of the said side wall to permit it to receive a filling-block $10^a$, that is of such proportionate dimensions as will adapt said block to fill the recess when in position therein, as shown in Figs. 2, 3, 5, 6, and 7, and the block $10^a$ is hinged to the main side wall at one end, as represented at *a* in Figs. 2, 3, and 5.

The hinged block $10^a$ is preferably sloped at the ends to render it shorter at the lower edge than at the upper edge, which will permit the said block to be rocked on its hinged connection and removed from or returned to the recess it normally occupies.

The lid 11 may be secured by a lock or seal after it is closed, and when the lid is in folded condition its side impinges on the block $10^a$ and will hold the latter down firmly on the bottom edge of the recess it is located in. In the case 10, near the hinged end of the lid 11, a roller is transversely located, which roller preferably consists of a longitudinally-perforated cylindric sleeve 12, in which the journaled shaft 13 is closely fitted.

Preferably the perforation of the sleeve 12 is rendered square in cross-section, and the body of the shaft 13 is given a corresponding form, having its ends which project outside of the sleeve reduced and made cylindrical to provide journals $b$ for the roller. The side walls of the case 10 are oppositely perforated to receive the journal ends $b$ of the shaft 13, and the said perforations are so relatively placed that the lower edge of the filling-block $10^a$ will be scalloped by one perforation to produce a half-box for one journaled end $b$, the lower wall or edge of the recess in which the block $10^a$ is seated being similarly scalloped, thereby completing the journal-box.

The roller-sleeve 12 is designed to afford a support for a paper strip A, which is printed to provide a series of similar blank tickets, that are joined, following one after the other, as indicated in Fig. 2, the said ticket-strip, which will hereinafter be more specifically described, being held by one end on the roller-sleeve, so that the strip may be closely wrapped thereon.

The preferred means for retaining one end of the ticket-strip A in connection with the roller-sleeve 12 consists in providing a clamping-strip $c$, that loosely fits in a longitudinal groove formed in the periphery of the roller-sleeve. The clamping-strip $c$ has a hinged connection at one end with the corresponding end of the roller-sleeve, as indicated in Fig. 5 at $c'$, and at the opposite end is latched fast thereto, as will be further explained.

A roller 14, of substantially the same dimensions as the roller-sleeve 12, is pivoted by its ends in the sides of the case 10, so as to lie in front of and parallel with the said sleeve. The journal ends $d$ of the roller 14 are engaged with perforations in the side walls of the case in a similar manner as the journals $b$ on shaft 13, the filling-block $10^a$ being scalloped on its lower edge to form a half-box bearing for one journal, which box is completed by the formation of a similar scallop in the lower edge of the recess wherein the block $10^a$ is embedded.

The roller-sleeve 12 and roller 14 have each a circumferential flange $e$, formed or secured thereon at one end, and at or near their opposite ends two gear-wheels 15 16 are located, which are affixed to the rollers and have their teeth meshed, so that a revoluble movement of the wheel 15, that is on the roller 12, in direction of curved arrow 1, will rotatably move the gear-wheel 16 on roller 14 toward the roller 12, as indicated by arrow 2 in Fig. 3.

At a suitable distance in front of the roller 14 a roller 17 is journaled in the sides of the case 10, this roller being preferably provided with a journal-shaft $17^a$, the journal ends $g$ of which are supported free to rotate in the sides of the case in the same manner as are the journals $b$ and $d$. Near the journals $g$ circumferential flanges $h\ h'$ are formed or secured on the roller 17, and below the latter an elongated clamping-bar 18 is supported to rock toward or from the roller by a loose engagement of journal ends $i$ of said bar with the perforated side walls of the case 10, as shown in Fig. 6, the clamping-bar being pressed toward the roller by springs $k$, that are preferably formed and arranged as shown in Figs. 6 and 7.

The rollers 14 17 are longitudinally grooved to receive clamping-strips $m\ n$, that are essentially like the strip $c$, and they have one end of each pivoted to a respective roller, so that the strips may be folded down into the grooves of the rollers, as indicated in Figs. 3, 5, 6, and 7.

A spring-catch $o$ (shown clearly in Fig. 6) is provided for each clamping-strip $c\ m\ n$, these catch-pieces being respectively affixed by one end to the inner side surfaces of the circumferential flanges $e$ and $h'$ of rollers 12, 14, and 17, the free depending ends of the catch-plates loosely contacting with the upper surfaces of the clamping-strips when the latter are fully depressed. The formation and location of these spring-catches adapt them to yield when the strips are folded down, so as to press the ends of the latter on the elastic catches, to release which it is necessary only to push them back from the ends of the clamping-strips when said strips are lifted to clamp material between them and the rollers wherein they are located.

The lid 11 of the case is transversely apertured at $11^a$ near the free end of the said lid, as shown in Figs. 1, 3, 4, and 7, this aperture being preferably rectangular and proportioned to expose a certain portion of each ticket on strip A when drawn so as to lie below the aperture, for a purpose which will be hereinafter explained.

Below the aperture $11^a$ a table 19 is stationed, this consisting, preferably, of a flat piece of suitable width and length, having depending legs in the form of rectangular blocks $19^a$. (Shown in Fig. 4.) The height of the table 19 is sufficient to locate its upper surface a short distance below the lower surface of the lid 11 when the latter is closed, and the table has a width which will adapt it to extend at its side edges somewhat beyond corresponding edges of the apertures $11^a$. The legs of the table 19 are sustained in place by having a sliding engagement with vertical recesses formed oppositely in the sides of the case 10 for their reception, so that when in position the table will be prevented from lateral displacement. At each end of the table 19, above the legs $19^a$, a clamping-bail $p$ is pivoted, so that the transverse bar of each bail will be permitted to swing and have a slight clearance from the end of the table it is adjacent to, as clearly shown in Figs. 7 and 8.

The bail-clamps $p$ are provided to secure the ends of a strip of carbon ribbon or paper *s* upon the ends of the table 19, the said strip being of a suitable width to nearly or completely cover the top of the table. To facilitate the introduction of the table 19 and bail-clamps *p* the case 10 may have notches formed on the side walls at proper points, which notches will loosely receive the clamps, as represented in Figs. 2, 5, and 7.

On the front wall of the case 10 and on the front end of the lid 11 two plates *r r'* are secured, the said plates together affording a passage through which the free end of the ticket-strip A may be drawn. As clearly shown in Figs. 1, 2, 3, 5, and 7, the plate *r*, which is affixed on the upper edge of the front wall of the case 10, has its rear edge that extends across within the case upwardly curved, and the plate *r'* on the lid has the rear edge bent down so as to nearly touch the plate *r* slightly forward of the free rear edge of the latter.

The front edges of the plates *r r'* are preferably located in the same vertical plane, and a notch *u* is cut in the upper plate *r'* near its center of length of sufficient size to admit the introduction of the end of the operator's thumb for pulling the ticket-strip A through the crevice afforded between the plates *r r'* for the passage of the same.

One means for securing the lid of the case 10 in folded adjustment may consist of a small lock or seal C, that engages opposite perforations in the plates *r r'*, so as to retain said plates in the position shown in Figs. 3 and 7, such a lock or seal being represented in Figs. 1 and 5.

On the roller 17 one end of a ribbon of blank paper B is secured with the clamping-strip *n*, as before explained, and said ribbon is wrapped in sufficient amount thereon. There is a portion of the paper ribbon B extended over the clamping-bar 18 and thence below the table 19, passing upward and around the forward edge of said table, which is rounded to permit a free sliding movement of the ribbon.

The blank ribbon B is drawn over the top of the table 19 between it and the carbon ribbon *s*, and thence is extended to be wrapped upon the roller 14, having its remaining end clamped thereto by the strip *m*. It will be understood that I do not limit myself to the arrangement of the ribbon B at an angle to the table 19, as said ribbon may, if preferred, be extended parallel with the table and contact with the roller at a higher point on the periphery of the roller than as shown in the drawings.

The ticket-strip A, as before mentioned, comprises a series of tickets joined at parallel edges, and these may be partially separated by a row of fine perforations formed between adjacent tickets of the series.

The marking of the similar tickets may be altered to comply with the requirements of the service to be rendered therewith. For illustration, one for printing the tickets is shown in Fig. 2, where it will be seen that two of the tickets have a blank space afforded in which the fare-collector is required to write the amount of cash fare received and also the names of stations on the railroad between which the passenger travels and that the fare collected is to pay for. One ticket that is located above the table 19 and below the aperture 11$^a$ of the lid 11 is filled in by the use of a hard lead-pencil or style, which will impress the written matter on the lower surface or back of the ticket and at the same time enter a similar record on the blank record-ribbon B, the carbon strip or ribbon *s* serving to effect such an impression in an obvious manner. By reason of the arrangement of the rollers 12, 14, and 17 and the geared connection of the rollers 12 14, together with the peculiar arrangement of the ticket-strip A and record-strip B, it will be evident that the simple act of drawing upon the free end of the ticket-strip to the extent necessary for the removal of a ticket from the case 10 will relatively dispose the next ticket for receiving a record, as has been explained, so that the ticket-strip serves as a medium for operating the register.

The peculiar construction of the plates *r r'* and relative disposition of their curved rear edges adapts said plates to prevent tampering with the carbon ribbon to prevent a marking of the ticket, and also affords a tension device to regulate the withdrawing of tickets from the case 10.

In service, the collector of fares, if the device is used on railroads or in other passenger conveyances, pulls a ticket A out of the registering device sufficiently to locate the blank spaces that are to be filled in by him over the table 19, and then writes in the cash-receipt as well as names of stations, as before mentioned. Then the ticket is farther withdrawn so that its marginal edge is over the transverse outer edge of the lower throat-plate *r*, which edge will sever the ticket if the operator presses the ticket thereon, so as to give a shear cut from one side edge of the ticket toward the opposite edge of the same. As each ticket is withdrawn the consequent movement of the record-strip B, due to the rotatable movement of the roller 14, will locate an unmarked surface of the said strip on the table 19 to receive an impression when the next ticket is marked by the cash-collector.

It will be seen that by use of the portable register herein described a correct account of all cash fares received may be kept by the fare-collector, as it may be made imperative for him to give each passenger a ticket that will not be regarded as valid if it does not have the cash paid and stations written on its back surface as well as on the face.

The device may also be used in offices of the railroad, and thus afford a check on station agents of the railroad, as the ultimate return of the tickets will show if local fares have been properly collected.

As before mentioned, the improved registering device is very well adapted for the issue of rebate-tickets on railroads, and from the manner of marking such tickets as issued will indicate the cash received and distance traveled, from which the rebate due may be readily computed at the office where the ticket is presented for collection of the rebate.

The novel registering device may also be used to keep account of cash receipts in all places where salesmen are employed, and will greatly facilitate the accurate rendering of accounts for such receipts by the clerk or other agent.

Having thus described my invention, I claim as new and desire to secure by Letters Patent—

1. The combination with a case, a lid securable thereon and having a transverse aperture near one end, a table in the case below said aperture, and a carbon strip held by its ends on said table, of a transverse roller adapted to hold a rolled ticket-strip, that extends one end therefrom through an end of the case over the carbon strip, a tension device at said end of the case through which the ticket-strip is drawn, two other rollers holding a record-strip which passes between the carbon strip and the table, and gearing adapted to transmit motion from the ticket-holding roller to one of the record-holding rollers, substantially as described.

2. In a registering device of the described construction, the tension device for a ticket-strip and which is also a guard and ticket-cutter, comprising two plates, respectively secured on an edge of the register-case and on an opposed end of the case-lid, said plates having adjacent edges within the register-case respectively curved toward the body and lid of the case, the curved edge of the plate on the lid nearly contacting with the concave side of the curved edge on the other plate, as specified.

3. In an autographic register, the combination of a case having a lid and a recess in one side wall, said recess being adapted to be covered by the lid when the lid is closed and having in its bottom a scallop, a roller having a journal at one end engaging the scallop in the bottom of the recess, and a filling-block hinged at one end to the casing and adapted to fit down in said recess in the side of the casing, said filling-block having a scallop in its under side to engage the upper surface of the journal of the roller, and being adapted to be held in engagement with said journal by the lid of the casing when said lid is closed, substantially as set forth.

GEORGE D. BOND.

Witnesses:
W. F. McLEMON,
E. B. GUTHRIE.